United States Patent [19]

Fuqua et al.

[11] Patent Number: 5,709,796
[45] Date of Patent: *Jan. 20, 1998

[54] PROCESS FOR DIGESTING CELLULOSE CONTAINING SOLID WASTES

[75] Inventors: Clark R. Fuqua, Greenwood; Ronald L. Thomas; Charles H. Gooding, both of Clemson, all of S.C.

[73] Assignee: Bio-Sep, Inc., Clemson, S.C.

[*] Notice: The term of this patent shall not extend beyond the expiration date of Pat. No. 5,326,477.

[21] Appl. No.: 651,667

[22] Filed: May 21, 1996

Related U.S. Application Data

[63] Continuation of Ser. No. 214,839, Mar. 17, 1994, abandoned, which is a continuation of Ser. No. 849,469, Mar. 11, 1992, Pat. No. 5,326,477, which is a continuation-in-part of Ser. No. 824,699, Jan. 21, 1992, abandoned, which is a continuation of Ser. No. 520,102, May 7, 1990, abandoned.

[51] Int. Cl.$^6$ .................................................. C02F 3/34
[52] U.S. Cl. .................... 210/632; 210/606; 435/277; 435/816
[58] Field of Search .................. 210/606, 632, 210/631, 612, 614; 435/277, 816

[56] References Cited

U.S. PATENT DOCUMENTS

| | | | |
|---|---|---|---|
| Re. 28,677 | 1/1976 | Blakley et al. | 241/46.08 |
| 3,563,241 | 2/1971 | Evans et al. | 604/365 |
| 3,595,235 | 7/1971 | Jespersen | 604/364 |
| 3,654,064 | 4/1972 | Laumann | 428/191 |
| 3,711,392 | 1/1973 | Metzger | 210/606 |
| 3,736,120 | 5/1973 | Tempe | 71/9 |
| 3,777,759 | 12/1973 | Oehmke et al. | 604/366 |
| 3,847,803 | 11/1974 | Fisk | 210/8 |
| 3,994,780 | 11/1976 | Klass et al. | 210/606 |
| 4,002,171 | 1/1977 | Taft | 604/364 |
| 4,009,313 | 2/1977 | Crawford et al. | 428/290 |
| 4,110,281 | 8/1978 | Dreer | 260/22 |
| 4,233,406 | 11/1980 | Weig et al. | 435/275 |
| 4,267,049 | 5/1981 | Erickson et al. | 210/632 |
| 4,267,050 | 5/1981 | Conway et al. | 210/608 |
| 4,338,399 | 7/1982 | Weil et al. | 435/99 |
| 4,342,650 | 8/1982 | Erickson et al. | 210/606 |
| 4,623,464 | 11/1986 | Ying et al. | 210/616 |
| 4,721,585 | 1/1988 | Santolini et al. | 210/616 |
| 4,755,296 | 7/1988 | Ying et al. | 210/631 |
| 4,810,386 | 3/1989 | Copa et al. | 210/631 |
| 4,826,493 | 5/1989 | Martini et al. | 604/327 |
| 4,857,198 | 8/1989 | Meidl | 210/603 |
| 4,861,721 | 8/1989 | Waterbury et al. | 435/252.1 |
| 4,880,592 | 11/1989 | Martini et al. | 264/514 |
| 4,936,996 | 6/1990 | Messing | 210/603 |
| 4,944,734 | 7/1990 | Wallach | 604/358 |
| 4,956,093 | 9/1990 | Pirbazari et al. | 210/631 |
| 4,964,857 | 10/1990 | Osborn | 604/395 |
| 5,019,267 | 5/1991 | Eberhard et al. | 210/632 |
| 5,026,363 | 6/1991 | Pratt | 604/395 |
| 5,047,332 | 9/1991 | Chahal | 435/42 |

FOREIGN PATENT DOCUMENTS

| | | |
|---|---|---|
| 0262040 | 3/1988 | European Pat. Off. |
| 010054 | 11/1972 | Japan |
| 071908 | 3/1975 | Japan |
| 0136747 | 10/1979 | Japan |
| 0078670 | 6/1981 | Japan |
| 0081176 | 7/1981 | Japan |
| 1-156574 | 4/1989 | Japan |
| 1-99696 | 4/1989 | Japan |
| WO 85/02690 | 6/1985 | WIPO |
| WO 91/17255 | 11/1991 | WIPO |

OTHER PUBLICATIONS

Wang and Pereira. Handbook of Environmental Engineering, vol. 2, "Solid Waste Processing and Resource Recovery" (1980).
Kumagai, Chemical Abstracts, 117: 27375x (1992).
Barsett, Chemical Abstracts, 117, 43074d (1992).

*Primary Examiner*—Thomas G. Wyse
*Attorney, Agent, or Firm*—Hoffmann & Baron LLP

[57] ABSTRACT

A process and apparatus for reducing the volume and mass of solid waste (A) by initially subjecting the solid waste to a digestive enzymatic solution (20) agitated by fluid jets (28) under conditions which convert substrate (12) into a liquid waste which is discharged through a conventional sewage system (30). Non-biodegradable plastic shells (10) may be collected in a strainer basket (24) to be removed for further solid waste treatment such as shredding and the like.

16 Claims, 1 Drawing Sheet

PROCESS FOR DIGESTING CELLULOSE CONTAINING SOLID WASTES

REFERENCE TO RELATED APPLICATION

This is a continuation of application Ser. No. 08/214,839, filed on Mar. 17, 1994, abn. which is a continuation of application Ser. No. 07/849,469, filed Mar. 11, 1992, which issued as U.S. Pat. No. 5,326,477 on Jul. 5, 07/824,699, filed Jan. 21, 1992, now abandoned, which is a file wrapper continuation of U.S. application Ser. No. 7/520,102, filed May 7, 1990, now abandoned.

BACKGROUND OF THE INVENTION

This invention is directed to a process and apparatus for reducing the volume and mass of solid waste, and more particularly, to converting a major portion of solid wastes into a liquified waste which is separated and discharged through a conventional sewage system.

With the advent of throw-away products, the final disposal of such products has become a problem to which considerable attention need be given. For example, since their introduction in 1961, disposable diapers have become very popular, becoming a $3 billion dollar a year industry with an estimated 85 percent of America's mothers using them. Increasingly, the disposable diaper and other disposable products have become a prime target of environmentalists who say the throw-away products lead to rapid filling of solid waste dumps and contribute to problems such as ground water contamination. Legislation to either ban or restrict disposable diapers is before the legislatures of at least a dozen states. Disposable diapers account for only 2 percent of the nation's trash, but they will last approximately 500 years in a landfill. One proposed solution is a more expensive disposable diaper which is said to be biodegradable in a landfill since it is based on corn starch. However, these biodegradable diapers may not be sufficiently decomposable in landfills because there is not enough moisture or oxygen available. Another solution is the return to cloth diapers. However, there are not enough cloth diapers or cloth diaper services in the country to accommodate the demand.

Numerous waste disposal methods for solid refuse have been proposed. U.S. Pat. No. 3,736,120 discloses a multi-step process. One of the steps includes digesting organic material in a finely ground condition to convert it to a fertilizer having a high nitrogen content. Enzymes are added in a controlled process which utilizes actinic light generated from rare gas light tubes and anaerobic fermentation.

U.S. Pat. No. 4,110,281 discloses a process for producing a compost which comprises grinding municipal waste, magnetically freeing iron contained in the waste, separating the mixture into components of various sizes by fractionation, and treating the mixture in a fermentation process.

Fisk (U.S. Pat. No. 3,847,803) has proposed a process in which biodegradable material in a sewage sludge is subjected to aerobic fermentation in the presence of bacteria and enzymes.

Japanese Patent Publication 89-156,574 has proposed treating sludge by pulverizing solids and reacting the material with an organic-polymer decomposing enzyme before an anaerobic digestion step.

U.S. Pat. No. Re. 28,677 discloses a mechanical process for size reduction of solid waste. The solid waste material is ground to a point where there is size reduction that can be pumped in a fluid form.

The prior art has been directed mainly to the use of mechanical processes for preliminarily separating the solid waste into components for further waste disposal treatment. While the prior art has applied various processes and apparatuses for waste treatment, the prior art has not provided a process of or which is satisfactory for substantially reducing the volume and mass of solid wastes, particularly such wastes as disposable products having substrates of absorbent material, such as disposable diapers and under pads from hospitals and nursing homes. These throw-away products represent a significant burden on landfills as well as create odor and health problems during temporary storage and transport. The cost of landfill space is increasing and there is much public concern over health problems associated with landfills.

Accordingly, an object of the invention is to provide a process and apparatus for solid waste disposal wherein a preliminary enzymatic digestive process is used for separating solid waste into components that are more amenable to subsequent disposal or treatment than the components leaving a purely mechanical preliminary process.

Another object of the invention is to provide a process and apparatus for solid waste disposal wherein a preliminary enzymatic digestive process is used for separating solid waste into liquified and residual solid waste forms to be handled more efficiently in subsequent disposal processes.

Another object of the present invention is to provide a process and apparatus for reducing the mass and volume of disposable solid waste so that a major portion may be converted into a liquified form for subsequent conventional treatment.

Another object of the present invention is to provide a process and apparatus for reducing the mass and volumes of solid waste by using a preliminary enzymatic digestion process to convert a major portion of the solid waste into a liquified form.

Another object of the invention is to provide a process and apparatus for reducing the mass and volume of disposable solid waste by first subjecting the solid waste to an enzymatic digestive process that converts a major portion of the solid waste into a liquified waste which can be discharged through a conventional sewage system, and the residual solid waste is removed for further mechanical processing.

SUMMARY OF THE INVENTION

The above objectives are accomplished according to the above invention by providing a solid waste disposal process wherein the mass and volume of solid waste is reduced by subjecting the solid waste to a preliminary enzymatic digestive process. This process conveys the solid waste into a liquified waste and a residual solid waste. The liquified waste is then discharged through a conventional sewage system. Solid wastes such as absorbent pads and the like which include a plastic shell and an absorbent fibrous substrate attached to the plastic shell are particularly suitable for the process. The plastic shell and substrate are separated by agitating the waste in an enzymatic digestive solution which degrades and converts the substrate into a liquified waste. The liquified waste is discharged, and the non-biodegradable shell is recovered as a residual solid waste.

The solid waste in the enzymatic solution is preferably agitated by using fluid agitation. The enzymatic solution preferably contains a cellulose enzyme, and more specifically an endoglucanase enzyme. The enzymatic solution contains an enzyme in a range of about 0.01 to 1.09% by weight of enzymatic solution and contains a volume of enzymatic treatment solution of about 0.20 to 1.0 gallons per pound of waste. The waste is agitated during a period in a range of about 0.5 to 6 hours, in a temperature range of about 32° to 140° F. The pH of the enzymatic solution is maintained in a range of about 3 to 9.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example is the invention is shown and wherein.

DESCRIPTION OF A PREFERRED EMBODIMENT

A solid waste disposal process is disclosed which includes reducing the mass and volume of solid waste by subjecting the solid waste to a preliminary enzymatic digestive process which converts the solid waste into a liquified waste and a residual solid waste. The liquified waste may be discharged through a conventional sewage system.

Figure 1:
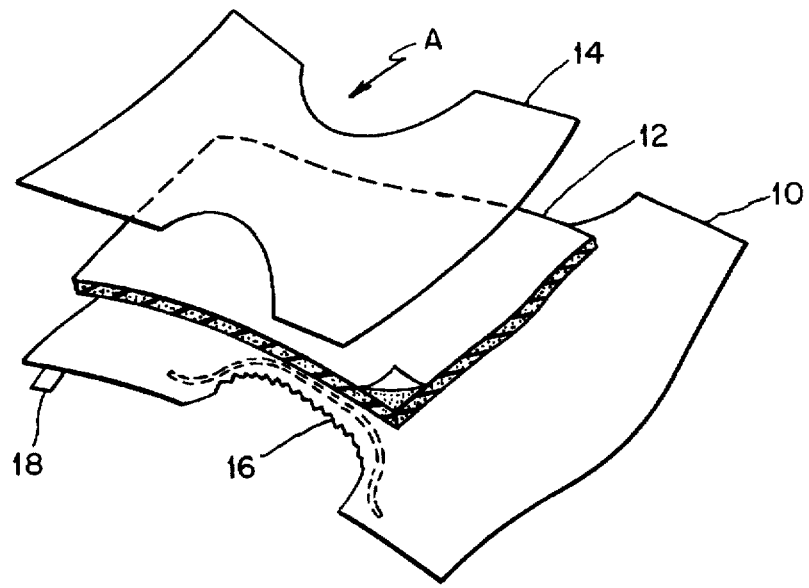
FIG. 1 is a perspective view with parts separated of a disposable throw-away product for whose mass and volume may be reduced in a solid waste disposal process and apparatus according to the invention.
Figure 2:
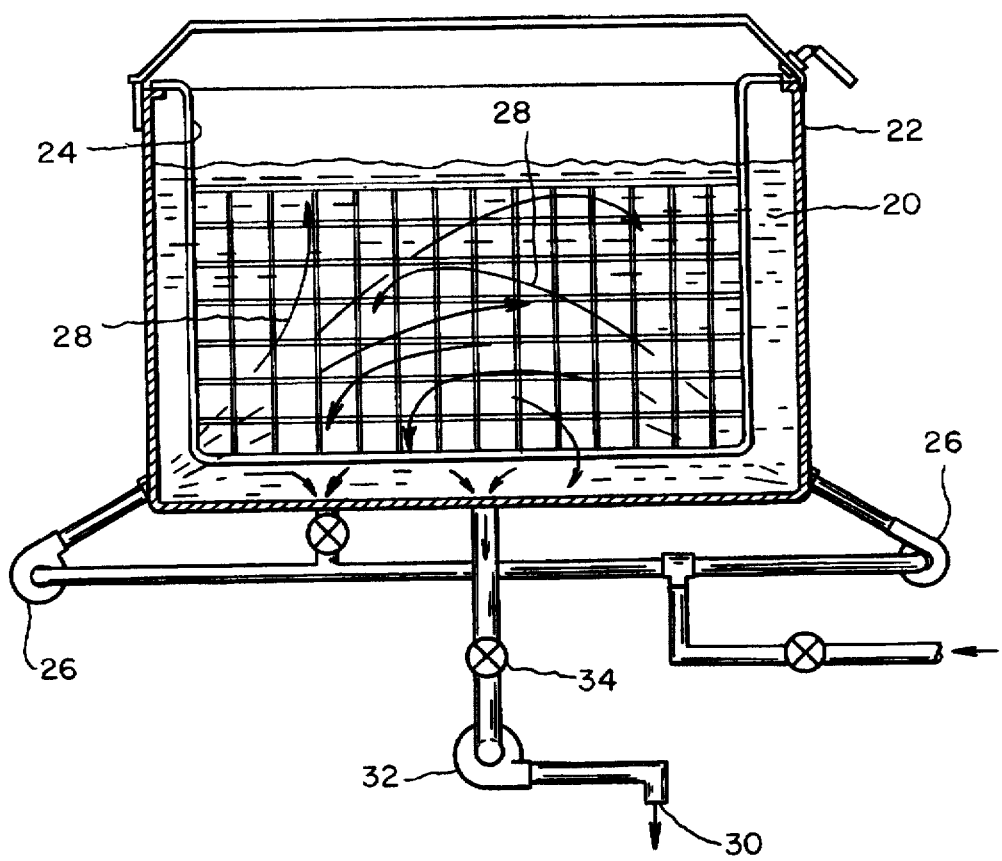
FIG. 2 is an elevation illustrating a process and apparatus according to the invention.

Referring now in more detail to the drawings, the process will be described for reducing the volume and mass of solid waste A of the type which includes a shell (10) and an absorbent substrate (12) physically attached to shell (10) by a liner (14) such as a disposable diaper or hospital under pad (FIG. 1). Typically liner (14) is a plastic liner which keeps moisture inside the diaper or pad. Elastic (16) may be provided to fit snugly around a person's legs to prevent leakage. Tape (18) secures the outside liner. Substrate (12) typically includes an absorbent layer filled with wood pulp and/or acrylic polymer crystals that can absorb up to 80 times their weight in moisture. Interior liner (14) holds the substrate in place and prevents moisture from flowing back to the skin. As can best be seen in FIG. 2, substrate (12) is separated from shell (10) by agitating the solid waste in an enzymatic solution contained in container (22) to degrade and convert substrate (12) into a liquified waste.

A number of disposable diapers or pads (A) may be placed in a strainer basket (24) which is submerged in the enzymatic treating solution within container (22). Strainer basket (24) may be wire mesh or may be opened for drainage by apertures.

Agitation of the solid waste in the enzymatic solution is provided by a plurality of a fluid pump (26) which provide fluid agitation in the form of fluid jets (28) which circulate in the enzymatic solution and agitate the solid waste to enhance contact of the solution and waste for degradation and digestion. Mechanical agitation may also be utilized, however, it is believed that agitation by fluid is more effective in breaking down the substrate since contact with the enzymatic solution is enhanced.

Cellulase enzymes are capable of degrading cellulose to glucose. Cellulase broadly includes three types of components, exoglucanase, endogluconase and cellobiose. References to cellulase are set forth in U.S. Pat. No. 4,861, 721, starting at col. 1, line 30.

Cellulase enzymes are commercially available. A representative source is Genencor, Inc. 180 Kimball Way, South San Francisco, Calif. 94080. The cellulase enzyme selected for the process can be determined by routine experimentation, depending on the specific types of waste, being treated by the process.

Preferably the enzymatic treating solution contains a cellulase enzyme, and specifically an endoglucanase enzyme. An exoglucanase may also be included in the enzymatic solution.

The pH of the enzymatic solution is maintained at a pH in the range of about 3 to 9. Although many cellulase enzymes are particularly active under acidic conditions, particularly pH 4–6, it has been found that the process works very well using tap water, of which the pH may be considerably closer to neutrality. Accordingly, it is preferred to carry out the process at pH from about 3 to about 7.

The use of endoglucanase has been found to be particularly beneficial in processing disposable diapers and under pads. The ability of the endoglucanase to indiscriminately attack the cellulose at different points in the molecular chain is believed to make the process rapid enough to facilitate commercial use.

Other enzymes may be added to the enzymatic solution, in accordance with the application of the invention being made. For example, protease may be added when the solid waste includes proteins, lipase may be added when the solid waste includes fats or greases, amylase may be added when the solid waste includes carbohydrates or starch, and hemicellulose and cellulase may be added in the case of cellulose and paper.

The amount of cellulase is selected so as to permit digestion of cellulosic substrate within a reasonable time period under the conditions used. It has been found that enzyme concentrations from about 0.01% by weight to about 1.0% by weight of the enzymatic treating solution will generally permit digestion within a reasonable time period. Preferably, the enzyme concentration is from about 0.05% by weight to about 0.2% by weight for reasons of economy.

The amount of enzymatic treating solution is selected so that the wastes can be agitated readily. The ratio of treating solution to wastes can be determined by routine experimentation. It has been found that agitation of solid wastes in volumes from about 0.20 to about 1.0 gallon of enzymatic solution per pound of solid waste generally produces satisfactory results. Preferably, from about 0.25 gallon to about 0.75 gallon of enzymatic solution is used per pound of solid wastes.

The temperature at which the process is carried out affects the rate at which the solid wastes are liquified by the enzymatic solutions. The enzymes are active from about 32° F. to about 140° F. It is preferred to carry out the process at higher temperatures, to accelerate the rate of enzymatic action. The temperature selected will, in part, be determined by the temperature of hot water available. It is, accordingly, preferred to carry out the process from about 90° F. to about 120° F.

The time during which the solid wastes are agitated with the enzymatic treating solution depends upon the concentration of the enzyme, the pH of the solution, the ratio of enzymatic solution to solid waste and the temperature of the enzymatic solution. The time at which the solid wastes are liquified can be determined visually or by the tube-and-funnel test. The time for agitating the mixture of enzymatic solution and solid wastes can be varied from about 0.5 hour to about 6 hours. Preferably, the period of agitation is from about 0.5 hour to about 2 hours.

While the invention is particularly advantageous for use in disposing of throwaway diapers and under pads to digest the substrate and recover the plastic material, the invention has application to a more general process of separating solid wastes which include a mixture of non-biodegradable and biodegradable components. The process and apparatus of the invention may be employed as a preliminary step to separate the non-biodegradable components by agitating the solid waste in a digestive enzymatic solution to degrade and convert the biodegradable components into a liquified waste. The liquified waste may be discharged through a conventional sewage system and the residual solid waste subjected to further solid waste treatment processes.

It can be seen that an advantageous process can be had for initially reducing the volume and mass of solid waste by means of degradation and digestion in an enzymatic solution rather than by mechanical processes as utilized in prior art waste disposal processes. Those solid waste components not digestible and liquefiable by enzymatic processes, can then be subjected to further waste treatment processes. Other chemical components can be added to the enzymatic solution during treatment to collectively break down, disinfect, and deodorize the solid waste.

It can be seen that an advantageous process and apparatus for treating solid waste such as throw-away diapers and under pads, paper, and food products, can be had by placing the waste in a mechanical device containing a solution of digestive enzymes and other chemicals, and held at appropriate conditions of temperature, pH, chemical composition, and agitation, until a major portion of the mass and volume of the solid waste is converted to liquid waste discharged in a conventional sewage system. The disposal of soiled diapers and under pads from homes, hospitals, and nursing homes, which now represents a significant burden on landfills, as well as creating odor and health problems during temporary storage and transport, is substantially reduced. The process eliminates the odor and health problems at the point of use, and reduces the solid waste load to a small fraction of present values.

DESCRIPTION OF MOST PREFERRED EMBODIMENT

In a most preferred aspect, the process of this invention is that which includes agitating said solid waste in enzymatic solution containing from about 0.05% to about 0.2% enzyme by weight and from about 0.25 to about 0.75 gallons of enzymatic solution per pound of waste, during an agitation period from about 0.5 hour to about 2 hours, at a temperature from about 90° F. to about 120° F., and a solution pH from about 3 to about 7.

Without further elaboration it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, the temperatures are set forth uncorrected in degrees Fahrenheit or Celsius. Unless otherwise indicated, all parts and percentages are by weight.

EXAMPLE 1

Twenty commercially available disposable diapers were each wetted with 500 ml of water to simulate a soiled condition and placed in a strainer basket and submerged in approximately 12 gallons of water in a tank. The water temperature was 100° F. and the pH was 6.2. Cellulase enzyme, at a concentration of 1.0% by weight of the resulting enzymatic treating solution, was added and the solution was recirculated by a centrifugal pump at approximately 3 gallons per minute to provide agitation. Further agitation was provided by revolving paddles located near the bottom of the tank. The temperature was maintained at 100° F. and the pH was maintained at 6.2 during the process.

Samples of the recirculating solution were taken at 10-minute intervals to determine optimum time of extraction and degradation of the cellulosic pad from the diapers. It was determined by viscosity reduction and by settling characteristics of the suspended matter that the degraded pad material could easily by pumped to a conventional sewer system along with the tank water after 40 minutes of processing. After the tank was pumped dry, the remaining plastic diaper shells were observed to be completely devoid of the absorbent pad. Considering the average weight of a soiled infant diaper is 1 to 1½ pounds, the remaining plastic shells represented about 2% of the original mass of the diapers.

EXAMPLE 2

(a) Funnel and Tube Test Procedure

A tube (2.7 mm inside diameter×26 cm length) was attached to the bottom of a 60° laboratory funnel. The bottom of the tube was plugged and the funnel was filled with 95 ml of liquid effluent from a test run. The plug was removed from the bottom of the tube and the time required to drain the contents of the funnel through the tube was measured, using a stopwatch.

Generally, the contents of the funnel did not drain at all early in a run because undigested fibers immediately plugged the small tube. In any run, a minimum process time was defined as the time at which the contents of the funnel drained completely, however slowly. More complete digestion (longer processing times) was manifested by faster drainage of the contents of the funnel and tube.

(b) Test Procedure

Tests were conducted in a General Electric heavy duty large capacity washing machine, model no. WWA56006ALWH or WWA8820GBLWH. The timers of the washers were disabled to permit easy manual control of the process time and conditions. Except as noted, tests were run with clean, previously dry PAMPERS brand Ultra Disposable Diapers, boys' size medium.

(c) Effect of Enzyme Concentration

Fifteen diapers were added to 18 gallons of water in the washing machine at 97° F. The amount of enzyme, required to produce an enzymatic treating solution of the stated concentration, was added and agitation was started. In all cases, physical separation of fiber from the plastic shells of the diapers occurred within about 10 min. After this point, the funnel and tube test was run at 10 min intervals, using liquid samples of the process water. The test is a measure of the acceptability of discharging the liquified waste to the sewer system. The following results were obtained:

Enzyme Minimum Process Time

| 0% by wt. test stopped after 240 min (funnel and tube plugged) | |
| --- | --- |
| 0.1 | 125 min |
| 0.2 | 90 min |
| 0.5 | 55 min |
| 1.0 | 35 min |

After the minimum process time was reached, except for the control, the machine was put in the automatic spin and rinse mode to discharge the liquified waste and rinse residual fibers from the residual plastic shells. The dry weight of the residual shells was about 20% of the weight of clean, dry weight of the original diapers (80% reduction in solid waste) and the volume about 90% of the original volume (90% reduction).

EXAMPLE 3

Effect of Process Parameters

Tests were done as in Example 2, varying operating parameters, including agitation, waste-to.water ratio, temperature and pH. A set of 60 experiments constituted a random balance test design, the results being evaluated as a function of the minimum process time according to the funnel-and-tube test.

(a) Effect of Agitation and Waste-to-Water Ratio

A run was made, using 0.5% by weight of enzyme at 97° F., in which 22 diapers were added to 18 gallons of water. Under these conditions, the minimum process time was 70 min.

Under otherwise identical conditions, using 15 diapers, the minimum process time was 55 min.

During the test using 22 diapers, movement of individual diapers in the machine was noticeably more restricted than in the case of the test using 15 diapers. This resulted in a longer time for physical separation of the fibers from the shells due to a reduction in agitation and a longer time for enzymatic degradation of the fiber due to reduced mass transfer in the liquid. The viscosity of the final liquid waste was also noticeably higher for the 22-diaper test, owing to the high fiber content.

These tests show that mechanical action within the washing machine influences the minimum process time and that the effectiveness of the mechanical action is affected by the waste-to-water ratio.

(b) Effect of Temperature

Successful tests were conducted at temperatures from 68° F. to 126° F. It is believed that further decreases in processing times could be obtained up to about 140° F., depending on the enzyme used. Below about 68° F., enzyme activity is decreased, resulting in longer processing times.

(c) Effect of pH

Successful tests were conducted at pH values ranging from 3.3 to 7.4. Lower pH values resulted in a reduction in the minimum process time, due to increased enzymatic activity. For an endoglucanase, the optimum pH is about 3.5 to 4.0.

EXAMPLE 4

Comparison of Enzymatic and Fermentative Processes

A sample of mixed liquor from the aeration tank of the Clemson University activated sludge waste treatment plant was obtained. This liquid is substantially the same in content and strength as the aerobic fermentation broth of Fisk, supra.

Tests were done four hours after this sample was obtained.

To 500-ml Erlenmeyer flasks were charged:

I. 250 ml of water and 2.5 g of cellulase enzyme having substantial endoglucanase activity
II. same as I
III. 250 ml of activated sludge mixed liquor
IV. same as III To each flask was added 9.0 g of fiber from an adult incontinence brief, manufactured by Medical Disposables Co. (Marietta, Ga.). Each flask was stoppered and vented to prevent spillage but maintain aerobic conditions. The flasks were mounted on a Burrell Wrist Shaker Model 75, set to agitation level 8 to simulate the mechanical action in a washing machine. The shaker was shut off at intervals to permit examination of the contents of the flasks.

At the end of one hour, the following observations were made: Flasks I and II: temperature 21.5° C., pH 6.0, partial degradation of fiber visually obvious, contents fail funnel and-tube test Flasks III and IV: temperature 21.5° C., pH 7.1; no visible fiber degradation; liquid was been absorbed into the fibers to form a virtually solid mass.

At the end of two hours, the following observations were made:

Flasks I and II: temperature and pH unchanged, fiber degraded to the extent that the contents of each flask passed the funnel-and-tube test, material in each flask was a relatively homogeneous slurry of fine cellulosic particles in liquid solution.

Flasks III and IV: pH and temperature unchanged; fibers rolled into discrete balls about 3 mm in diameter, contents of flasks could barely be poured out of the opening in the top of the flasks and could not pass the funnel-and-tube tests.

Results at 4, 12, 26, 39, 48, 61 and 72 h were as for 2 h; the contents of III and IV never showed any signs of fiber degradation.

These results show that the activated sludge mixed liquor does not accomplish degradation of the fibrous waste materials in a reasonable time period, whereas the cellulase enzymes are highly effective.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A solid waste digestion process comprising reducing the mass and volume of substantially untreated solid waste having cellulose as its major component by subjecting the solid waste to a preliminary enzymatic digestive process, in the presence of an enzymatic solution at a controlled temperature without appreciable bacterial fermentation from added microorganisms, to convert the solid waste into a liquefied waste and any residual solid waste; separating the resulting liquefied waste from said any residual solidified waste and discharging the resulting liquefied waste.

2. The process of claim 1 including agitating said solid waste in an enzymatic solution during said enzymatic digestive process which contains a cellulase enzyme.

3. The process of claim 2 wherein endoglucanase is included in said enzymatic solution.

4. The process of claim 2 wherein exoglucanase is included in said enzymatic solution.

5. The process of claim 2 including agitating said solid waste in said enzymatic solution by using fluid agitation.

6. The process of claim 1 including agitating said solid waste in said enzyme solution containing an enzyme in a range of about 0.01 to 1.0% by weight of the enzymatic solution and a volume of enzymatic solution of about 0.20 to 1.0 gallons per pound of waste; agitating said solid waste during an agitation period in a range of about 0.5 to 6 hours; at a temperature range of about 32° F. to 120° F.; and maintaining the pH of said enzymatic solution at a pH in a range of about 3 to 9.

7. The process of claim 6 including agitating said solid waste in said enzymatic solution containing from about 0.05% to about 0.2% of enzyme by weight and from about 0.25 to about 0.75 gallons of enzymatic solution per pound of waste, during an agitation period from about 0.5 hour to about 2 hours, at a temperature from about 90° F. to about 120° F., and a solution pH from about 3 to about 7.

8. The process of claim 1 wherein said untreated solid waste having cellulose as its major component is selected from the group consisting of throw-away diapers, underpants, paper, and food products.

9. A solid waste digestion process for reducing the mass and volume of substantially untreated solid waste having cellulose as its major component, the process consisting essentially of: subjecting solid waste having cellulose as its major component to a preliminary enzymatic digestive process, in the presence of an enzymatic solution at a controlled temperature, to convert the solid waste into a liquefied waste and any residual non-cellulose solid waste; separating the resulting liquefied waste from said any residual non-cellulose solid waste; and discharge the resulting liquefied waste.

10. The process of claim 9 including agitating said solid waste in an enzymatic solution during said enzymatic digestive process which contains a cellulase enzyme.

11. The process of claim 10 wherein endoglucanase is included in said enzymatic solution.

12. The process of claim 10 wherein exoglucanase is included in said enzymatic solution.

13. The process of claim 9 including agitating said solid waste in said enzymatic solution by using fluid agitation.

14. The process of claim 9 including agitating said solid waste in said enzyme solution containing an enzyme in a range of about 0.01 to 1.0% by weight of the enzymatic solution and a volume of enzymatic solution of about 0.20 to 1.0 gallons per pound of waste; agitating said solid waste during an agitation period in a range of about 0.5 to 6 hours; and at a temperature range of about 32° to 120° F.; and maintaining the pH of said enzymatic solution at a pH in a range of about 3 to 9.

15. The process of claim 14 including agitating said solid waste in said enzymatic solution containing from about 0.05% to about 0.2% of enzyme by weight and from about 0.25 to about 0.75 gallons of enzymatic solution per pound of waste, during an agitation period from about 0.5 hours to about 2 hours, at a temperature from about 90° F. to about 120° F., and a solution pH from about 3 to about 7.

16. The process of claim 10 wherein said untreated solid waste having cellulose as its major component is selected from the group consisting of throw-away diapers, underpants, paper, and food products.

* * * * *